March 13, 1928.  1,662,715
R. H. MORROW
HANDLE
Filed March 10, 1926
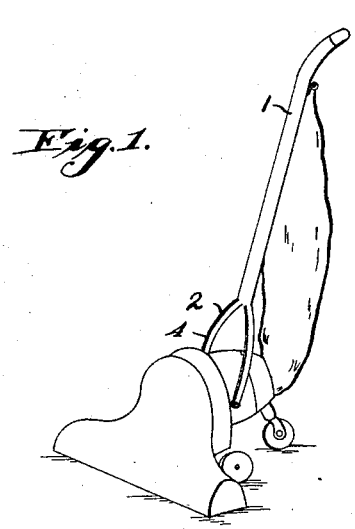
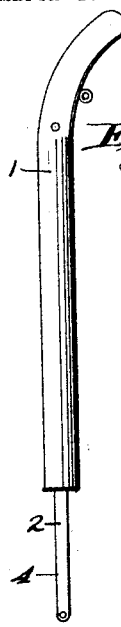
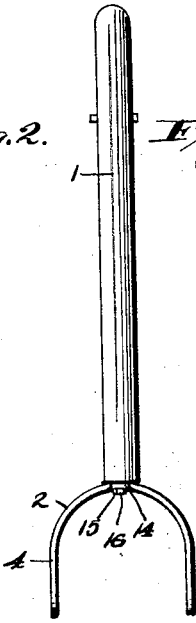
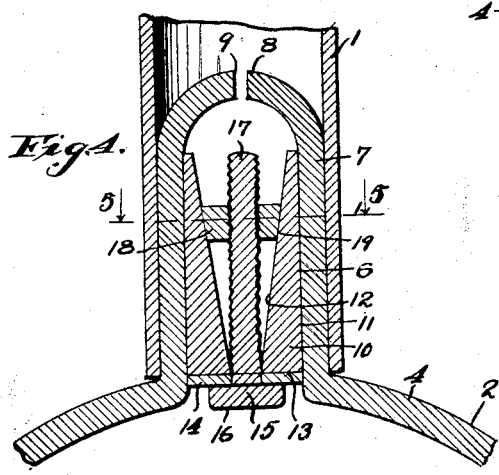
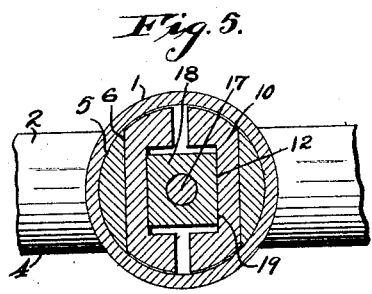
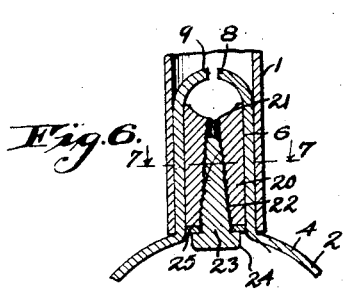
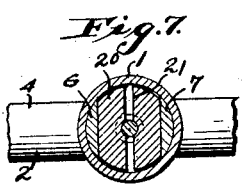
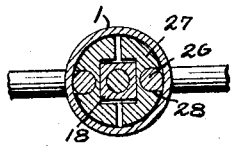
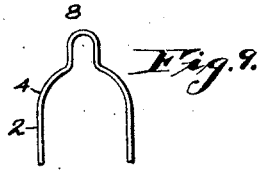
Inventor
R. H. Morrow
by Hazard and Miller
Attorneys Patented Mar. 13, 1928.

1,662,715

UNITED STATES PATENT OFFICE.

RICHARD H. MORROW, OF LOS ANGELES, CALIFORNIA.

HANDLE.

Application filed March 10, 1926. Serial No. 93,606.

My invention is in a handle and particularly in a handle attachment by which a tool or other device may be secured to the end of a wooden handle, a ferrule on such handle or on the end of a tubular handle.

An object of my invention is to provide a handle having an attachment for a yoke utilized to guide a vacuum cleaning device.

A specific object of my invention is to provide a handle attachment to secure a yoke-like member formed in two parts in a tubular handle or in a ferrule formed on the handle so that the yoke may be held in rigid relation thereto and be readily demountable.

In the construction of my handle and the attachment a yoke-like member formed in two parts having curved external surfaces and flat inside surfaces, is inserted in the handle or tubular member and a pair of pressing members or wedges are forced outwardly against the flat surface of the yoke member by means of a screw which wedges the yoke in a firm manner in the handle or other tubular ferrule.

My invention will be more readily understood from the following description and drawings, in which:

Figure 1 is a perspective view of a handle with my yoke attached thereto, forming a handle for a vacuum cleaner.

Fig. 2 is a side elevation of the handle.

Fig. 3 is a front elevation thereof.

Fig. 4 is a vertical section on the line 4—4 of Fig. 2.

Fig. 5 is a horizontal section on the line 5—5 of Fig. 4.

Fig. 6 is a vertical section similar to Fig. 4, of a modified form of attachment.

Fig. 7 is a cross section on the line 7—7 of Fig. 6.

Fig. 8 is a cross section similar to Fig. 5 of an alternative construction showing the yoke made of a circular bar.

Fig. 9 is a detail of a yoke formed in one piece.

The general type of handle embodied in my invention is indicated in Figs. 1, 2 and 3, in which a handle structure 1 is provided with a yoke or prongs 2, the yoke being adapted to be connected to some mechanism such as the vacuum cleaner indicated by the numeral 3. It will be understood however, that the yoke may be secured to any other type of mechanism and thus the handle may be applied for general purposes. My invention pertains particularly to a device for attaching the yoke to the handle.

In the construction shown in Figs. 4 and 5, the handle is indicated as tubular which may be considered as indicating either a handle which is tubular from end to end or a ferrule on the end of a solid handle. The yoke 2 is formed of separate bars 4, these bars being of the so-called half round construction or partially round having a curved surface 5 and a straight cord 6 across the back as clearly indicated in Fig. 5, which indicates the upward projections 7 of the bars in the tubular handle. The upper ends of the bars are preferably bent upwardly towards each other as indicated by the numeral 8, leaving however, a space 9 between the upper ends.

Wedge blocks 10, having a flat base 11, a sloping wedging side 12 and a flat outer end 13, are inserted in the end of the handle between the projections 7 of the yoke members. A washer 14 fits snugly against the ends 13 and a bolt 15 having a head 16 and a threaded end 17 is inserted between the wedge blocks 12 being threaded through a wedging nut 18, the latter having tapered sides 19 conforming to the slope of the wedging side 12 of the blocks.

The manner of operation of my handle connection as shown in Figs. 4 and 5 is substantially as follows:

As the various elements are inserted in the tubular handle or ferrule as above described, the bolt is turned by means of the head 16, using a wrench or the like in the proper direction to draw the wedging nut 18 outwardly. This action forces the wedging blocks tightly against the projecting ends 17 of the yoke members and clamps them tightly in the handle or ferrule. In order to disconnect the yoke members from the handle it is only necessary to reverse the direction of turning the bolt and the parts may be entirely freed from the handle.

In the construction shown in Figs. 6 and 7 the projecting ends 7 of the yoke members 4 are substantially the same as set forth in connection with Figs. 4 and 5, however, in this case a split wedging nut 20 is utilized having a split 21 in the nut. The nut has a threaded taper 22 which is engaged by a tapered bolt 23 having a head 24, the latter being adapted when in its innermost position to bear against a ring or washer 25.

The manner of using my handle connection of Figs. 6 and 7 is substantially as follows:

The projecting ends 7 of the yoke are inserted in the tubular handle, the split nut is then located in position and the tapered bolt threaded inwardly, thereby expanding the split nut and tightly clamping the yoke members to the handle. To disconnect the structure the bolt is unscrewed and thereby releases the yoke members, allowing withdrawal of the handle.

In the construction shown in Fig. 8, the yoke is formed with circular bars 26 instead of the partially rounded bars 5 of Fig. 5, such bars being pressed outwardly by wedge blocks 27 having grooves 28 in which the upper portion of the prongs fit. It will thus be seen that when the wedging nut 18 is tightened the upper portion of the yoke is pressed outwardly against the handle structure 1.

In Fig. 9 the upper ends 8 of the yoke instead of having the space 9, that is instead of the yoke being formed in two parts, is formed of a single element attached to the frame of the vacuum cleaner as illustrated in Fig. 1.

It will be understood that if the yoke is formed with a split end that it is not necessary that the ends be curved as indicated by the numeral 8 in Figs. 4 and 6. Moreover, in the structure of Figs. 6 and 7 it is not necessary that both the split nut and the bolt 23 be tapered as a tapered split nut and a parallel sided bolt or a parallel sided split nut with a tapered bolt would have a wedging action on the sections of the nut and thereby press the yoke into close engagement with the handle structure.

Although my handle and attachment of a yoke or the like thereto, is of a simple character, it is apparent from the above description and drawings, that the principle of my invention may be considerably changed in general details and in specific features. Hence such changes would be within the spirit of my invention as set forth in the description, drawings and claims.

Having described my invention, what I claim is:

1. A handle attachment comprising in combination a tubular handle, a yoke having split ends inserted in the handle, the ends having curved outer surfaces and flat inner surfaces, a plurality of wedging blocks having wedging surfaces tapering from the inside towards the open end of the handle, a screw threaded bolt and a wedging nut on the bolt in contact with the wedging surfaces of the wedging blocks.

2. A handle attachment as claimed in claim 1, having in addition a washer engaging the outer ends of the wedging blocks, the bolt having a head engaging the said washer, and the wedging nut being tapered on two sides.

3. A handle attachment comprising in combination an imperforate tubular handle structure, a supporting element secured thereto, said element having externally curved surfaces in contact with the handle, and flat inner surfaces, wedging members bearing against the flat surfaces of the supporting member, and a screw threaded bolt having an operative connection with said wedging members adapted to wedge same apart.

In testimony whereof I have signed my name to this specification.

RICHARD H. MORROW.